July 1, 1930.  L. LEPAGE  1,769,796

FLOOR POLISHING AND WAXING DEVICE

Filed Jan. 10, 1927

INVENTOR
Lucien Lepage

Att'ys

Patented July 1, 1930

1,769,796

UNITED STATES PATENT OFFICE

LUCIAN LEPAGE, OF ORLEANS, FRANCE

FLOOR POLISHING AND WAXING DEVICE

Application filed January 10, 1927, Serial No. 160,268, and in France January 29, 1926.

My invention relates to a floor polishing and waxing device which comprises an electric motor and a set of plates provided with friction members, which may be given a reciprocating motion upon the floor by the said motor. The friction members are secured to the said plates in such manner that they may be readily renewed.

By this apparatus the floor may in the first place be well cleaned by the use of suitable friction members adapted for the purpose, and may then be waxed by the use of other friction members, whereby the floor may be given a polished and brilliant aspect. The said apparatus is so disposed that it will operate in the lengthwise direction of the flooring boards.

Figure 1:
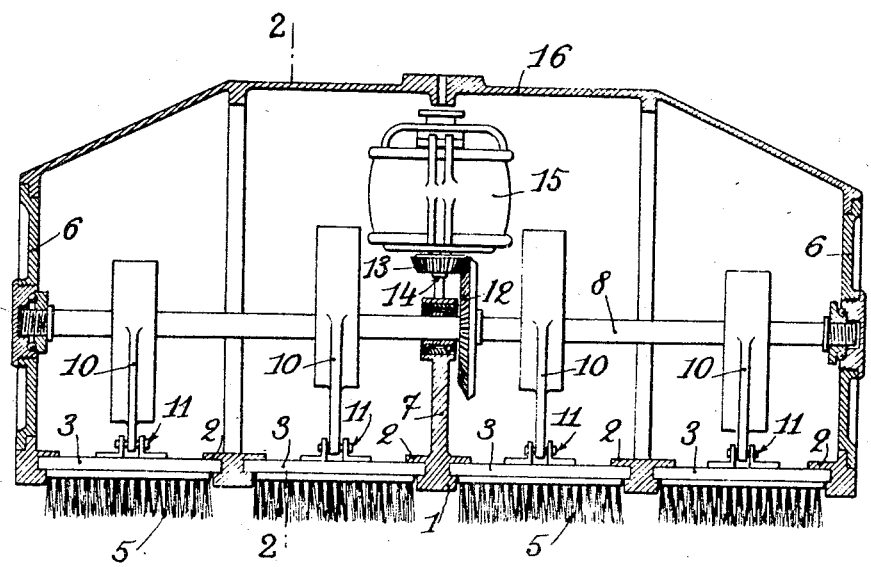
Figure 2:
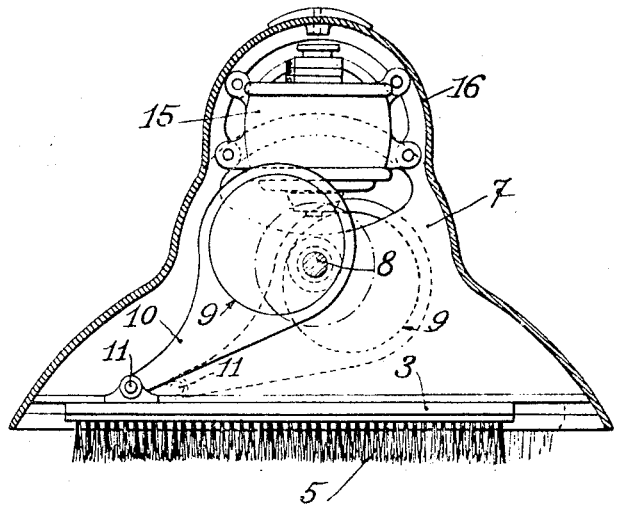

The appended drawings show by way of example an embodiment of the invention.
Fig. 1 is a longitudinal section of the apparatus, and Fig. 2 a cross section on the line 2—2 of Fig. 1.

The said apparatus comprises a base 1 provided with guides 2 in which the plates 3 are slidable. To the under side of said plates may be secured the removable friction members 5 consisting for instance of brushes.

The base 1 comprises two end portions 6, and a middle partition 7, in which is rotatably mounted the longitudinal shaft 8. To the said shaft, adjacent the plates 3, are fixed the eccentrics 9 controlling the connecting rods or links 10 which are pivotally mounted on the pivots 11 disposed upon the said plates.

The said eccentrics are so disposed that the plates will be displaced in pairs in opposite directions in order to properly balance the stresses. In the represented example, the two middle friction elements move together in a reverse direction to the end or extreme friction elements; whereas their surfaces are equal, the friction stresses upon the ground will constantly balance themselves so that the whole will neither tend to pivot about itself, nor to move forwards or backwards. Upon the said shaft 8 is mounted a bevel gear 12 coacting with a smaller bevel gear 13 fixed to the shaft 14 of the electric motor 15. Adjacent the motor is preferably disposed the movable cover 16 which is suitably secured to the base 1 and which forms together with the end parts 6 an entirely closed case containing the whole mechanism.

Having thus described my apparatus, what I claim as new therein, and my own invention, is:

In a floor polishing and waxing apparatus, the combination of a base, two series of friction members movable along parallel guides on the said base, and means for imparting to the said friction members a reciprocating movement, the friction members of each of the said two series being symmetrically arranged relatively to the center of the apparatus, having an equal friction surface, and means for moving the friction members of one series in opposite directions to the friction members of the other series.

In testimony whereof I have hereunto affixed my signature.

LUCIEN LEPAGE.